Oct. 14, 1952          J. J. DIERBECK          2,613,429

METHOD OF FORMING RINGS FOR BEARINGS

Filed May 3, 1947          3 Sheets-Sheet 1

Inventor
John J. Dierbeck
By Paul O. Pippel
Atty.

Oct. 14, 1952 J. J. DIERBECK 2,613,429
METHOD OF FORMING RINGS FOR BEARINGS
Filed May 3, 1947 3 Sheets-Sheet 2

Inventor
John J. Dierbeck
By Paul O. Pippel
Atty.

Oct. 14, 1952 J. J. DIERBECK 2,613,429
METHOD OF FORMING RINGS FOR BEARINGS
Filed May 3, 1947 3 Sheets-Sheet 3
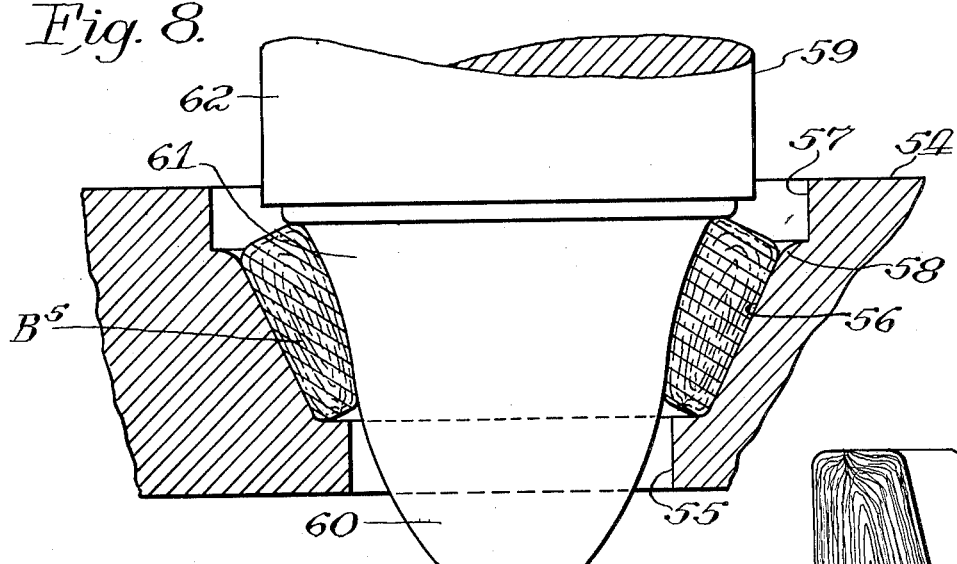
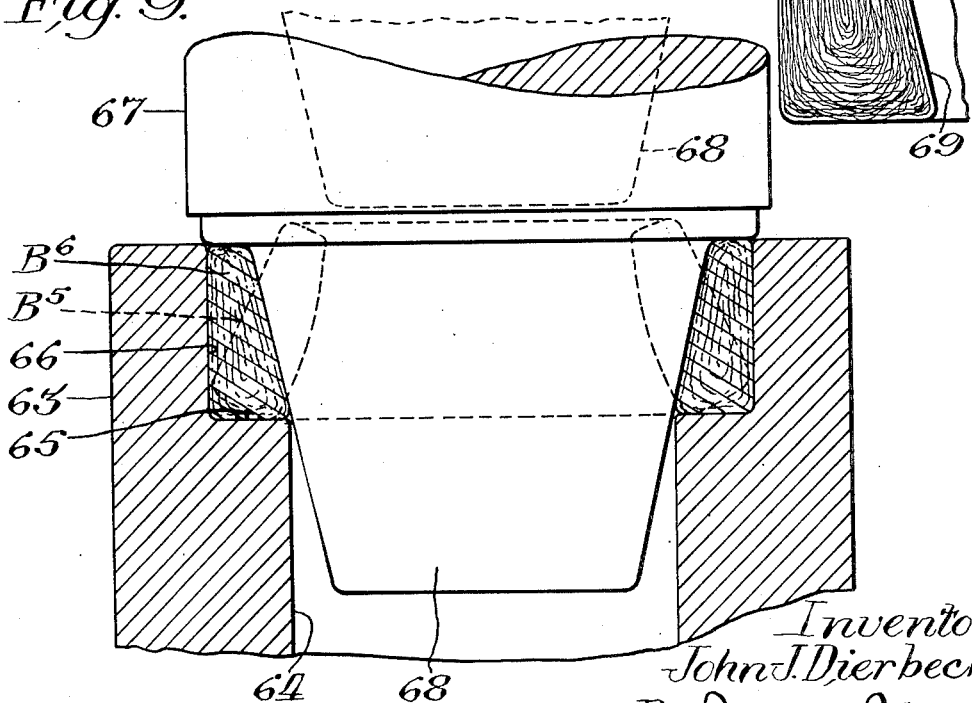
Inventor
John J. Dierbeck
By Paul O. Pippel
Atty.

Patented Oct. 14, 1952

2,613,429

UNITED STATES PATENT OFFICE 2,613,429

METHOD OF FORMING RINGS FOR BEARINGS

John J. Dierbeck, Milwaukee, Wis., assignor to International Harvester Company, a corporation of New Jersey Application May 3, 1947, Serial No. 745,778

1 Claim. (Cl. 29—148.4)

This invention relates to a method especially adapted to the manufacture of races for roller bearings and for members of a similar shape. More specifically, it relates to a forming method for bearing races in which the metal is worked in such a way as to obtain the most desirable grain structure in the final article.

In the manufacture of races for bearings, such as tapered roller bearings, various methods have been followed to form such members out of rolled steel, which is a required metal in order to obtain a bearing having the desired strength and heating characteristics. As said members are ring shaped, serious problems have been encountered in forming them from rolled steel to obtain the desired grain flow in the finished ring and to avoid excessive scrap material.

The principal object of the present invention is to provide a method of manufacturing bearing races from bar stock without the loss of any substantial amount of material as scrap and to so form the annular race member that maximum density of grain structure is obtained at the wearing surface of the bearing member.

The above object and others which will be apparent from the description to follow are obtained by a method as will be described in the specification. As a means of illustrating how the method can be practiced, the drawings show diagrammatically different steps in a preferred method.

In the drawings:

Figure 8 illustrates the completion of the forming step, the beginning of which is shown in Figure 7.

Figure 9 shows the final operation of operating upon the blank produced by the operation illustrated in Figure 8.

Figure 10 is an enlarged section illustrating the final grain disposition in the completed bearing race.

Figure 1:
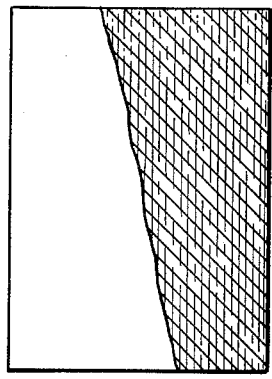
Figure 1 is a plan view of a section of cylindrical stock used for making bearing races according to the method of the invention.
Figure 2:
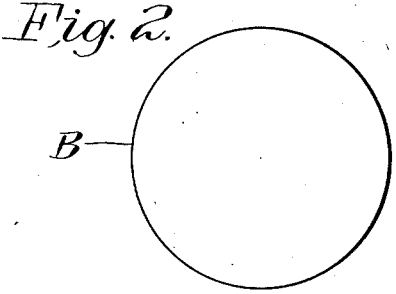
Figure 2 is a plan view of the element shown in Figure 1.

As shown in Figures 1 and 2 of the drawings, the manufacture of bearing races according to the invention starts with a cylindrical blank B having a length substantially longer than its diameter. Said blank may be sheared or sawed from bar stock by any suitable means without any substantial loss of material as scrap.

The blank B of Figure 1 is placed between dies designated in their entirety by the reference characters 10 and 11. The lower die is provided with a recess 12 formed by a flat bottom surface 13 and a conical wall 14 extending outwardly and upwardly from the bottom wall 13. The upper die 11 is provided with a recess 15 formed by a flat surface 16 and a conical wall 17 extending downwardly and outwardly from the bottom surface 16. An annular surface 18 surrounding the die 10 adjacent the conical wall 14 is adapted to abut a similar annular surface 19 formed on the die member 11 adjacent the conical wall 17.

Figure 3:
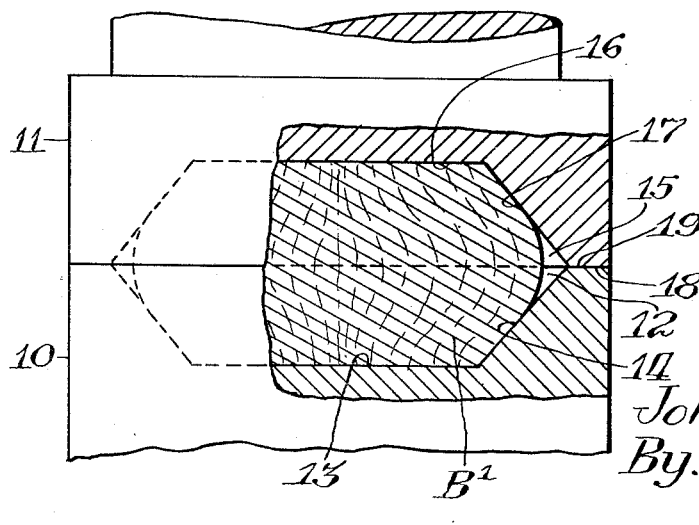
Figure 3 is a diagrammatic view of dies and their relationship to a blank being preformed for a subsequent operation.

In the forging or forming step illustrated in Figure 3 the blank B is heated, as this operation is performed with the blank in a heated condition. After the dies have come together as illustrated in Figure 3, the blank B has been altered in shape as designed by $B^1$ in Figure 3. If the blank B is originally cut from rolled bar stock, the grain flow is in parallel lines of the blank. With an operation as illustrated in Figure 3, the lines of grain flow are bulged as illustrated by the lines in Figure 3. Tests made by micro-photographs of etched samples show clearly the grain structure as illustrated in Figure 3.

Figure 4:
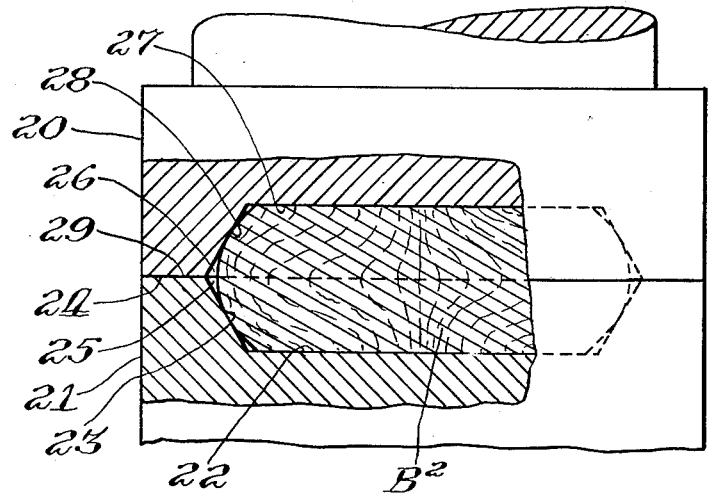
Figure 4 is a view similar to Figure 3 showing a further step in the initial formation of a blank for forming bearing races.

As a further operation, after the step illustrated in Figure 3, a similar operation may be followed as shown in Figure 4, further flattening the blank in an axial direction. In some instances it may be satisfactory to flatten the blank from its original shape as shown in Figure 1 directly to the shape shown in Figure 4, which will be referred to as $B^2$. The dies in Figure 4 are very similar to Figure 3, an upper die 20 and a lower die 21 being illustrated. The lower die 21 is provided with a flat bottom surface 22 and a conical outwardly and upwardly extending wall 23 joining the bottom portion and an annular abutting portion 24 formed on the upper surface of the die. The surface 22 and the wall 23 form a recess 25. The upper die is provided with a recess 26 formed by a flat surface 27 and a conical wall 28 which terminates adjacent an annular abutment surface 29. It will be noted that in Figures 3 and 4 there is space left after the two dies have come together, resulting in a rounded shape to the blank being formed and eliminating any flash or die marks at the central peripheral portion of the blank.

Figure 5:
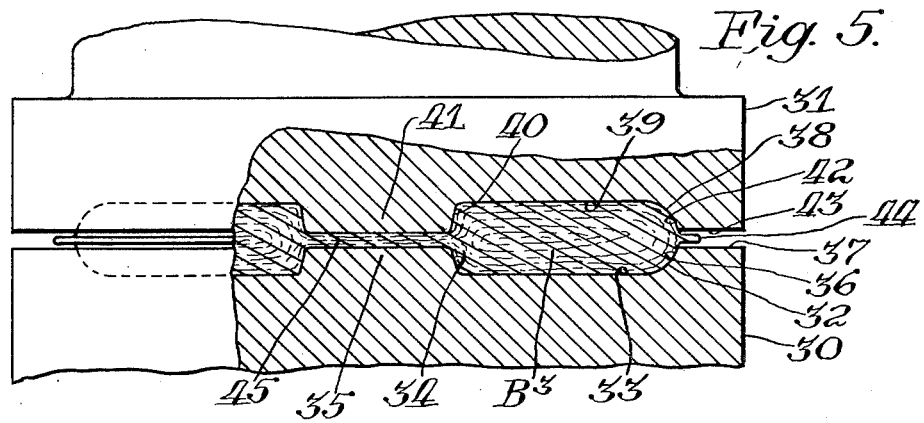
Figure 5 illustrates another step in which the blank is further acted upon in a subsequent operation with forming dies.

Figure 5 shows in sequence the next step in applicant's method by which a bearing race is formed. The blank $B^2$ from Figure 4, or a similar blank, is placed between two dies 30 and 31 as diagrammatically illustrated in Figure 5. The lower die 30 is provided with an annular recess 32, which has a flat annular bottom wall 33, a slightly conical inner wall 34 formed by a central upward projection 35, and a curved outer wall 36 which terminates adjacent an annular upper surface 37 formed on the die 30.

The upper die 31 is formed with a recess 38 which is identical in shape and size to the recess 32. Said recess is formed by an annular flat surface 39, a slightly tapered inner surface 40 which is the wall of a central projection 41, and a curved outer surface 42 terminating adjacent an annular surface 43 formed on the die 31 around the recess 38.

Figure 5 illustrates a completion of the forming operation. It will be noted that the surfaces 37 and 43 are spaced somewhat apart and that a forging flash or fin 44 projects outwardly from the blank, which at this step will be designated as $B^3$. It will also be noted that the projections 35 and 41 are spaced apart, leaving a relatively thin web 45.

Figure 6:
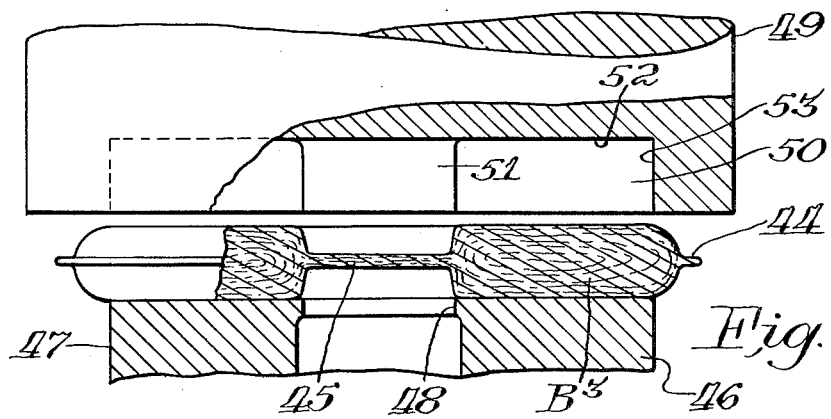
Figure 6 illustrates another step in which the annular flash or fin and center web remaining after the step shown in Figure 4 is removed.

In Figure 6 mating dies are illustrated for removing the fin 44 and the central web 45. A lower die 46 has an outside cylindrical wall 47 of the diameter of the blank and a central opening 48 of the diameter of the final inside diameter of the blank. An upper die 49 is provided with an annular recess 50 formed by a substantially cylindrical center projection 51, an annular surface 52 at the bottom of the recess, and a substantially cylindrical surface 53 forming the outer wall of the recess. It is to be understood that a slight draft can be provided by slight tapering of the surface 53 and the surfaces of the projection 51 in order to withdraw the sheared blank from the dies. The dotted lines on the blank $B^3$ in Figure 6 indicate the shear lines.

Figure 7:
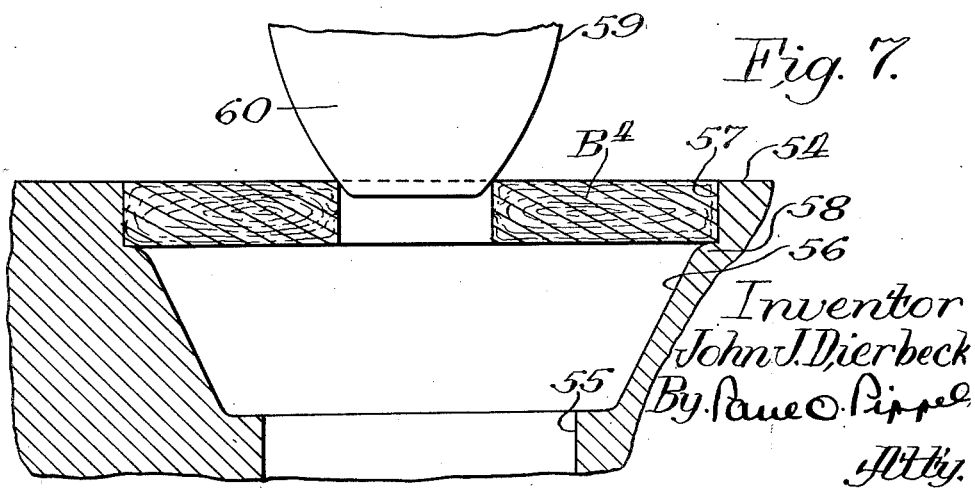
Figure 7 illustrates a holding die and the beginning of an operation for operating upon the annular blank from the operation shown in Figure 6.

Figure 7 illustrates the blank designated as $B^4$ obtained from the operation performed by the structure shown in Figure 6. Said blank is placed in a die 54 having a cylindrical bore 55, the conical wall 56 joining said bore, a cylindrical wall portion 57 corresponding generally to the outer surface of the blank $B^4$, and a curved portion 58 joining the top of the conical portion 56 and the bottom of the wall 57. The blank $B^4$ as illustrated lays on the portion 58.

A forming punch 59, the lower tapered portion 60, which is shown in Figure 7, is of a sufficiently reduced shape to engage the central opening in the blank $B^4$.

Figure 8 shows the remainder of the die 59 after the operation, the beginning of which was illustrated in Figure 7, is completed. Said die, in addition to the tapered lower portion 60, includes a further curved diverging portion 61 which is joined with the main portion 62 of the die. It will be noted that the portion 61 has a reversed curve with respect to the portion 60 to better shape and form the interior surface of the blank being operated upon which will be designated in a form shown in Figure 8 by the reference character $B^5$.

Figure 9 shows the final step in applicant's method of forming a bearing race. The dotted lines of Figure 9 illustrate the blank $B^5$ obtained from the operation illustrated in Figure 8. A lower die 63 is formed with a central cylindrical bore 64, a stepped shoulder 65, and an upper cylindrical bore 66. The blank $B^5$ is adapted to rest on the shoulder 65 at the beginning of the forming operation.

An upper die 67 is provided with a conical forming portion 68 which is adapted at its lower end to fit within the blank $B^5$ as illustrated in dotted lines at the beginning of the forming operation. The conical shape of the blank $B^5$ is then inverted so that the inside conical angle is in the opposite direction as evident by the final form of the blank which is designated as $B^6$. The final blank $B^6$ very closely approximates the final shape and dimensions of the bearing race, with the result that it is necessary to remove a minimum of material to provide the finished bearing race.

Throughout the drawings, lines have been shown in the successive stages of the formation of the blank to illustrate the change in the grain structure of the material. This is particularly significant, as by applicant's method there is a compacting of the material without any appreciable disruption of the grain flow with the result that the final grain structure as illustrated in the large section of Figure 10 is uniform and in the direction of the wearing face 69 of the bearing race. This is the most desirable type of wearing surface and at the same time maximum strength is obtained in the bearing race. With the grain flow resulting in a grain structure as illustrated in Figure 10, machining and finishing operations have a minimum effect upon setting up disruption or in any way varying the uniform cross sectional strength of the bearing race. Such a grain structure is also very adaptable to hardening without setting up disrupting strains in the material.

The bearing race manufacturing method as above set forth lends itself to induction heating as the small original cylindrical blanks can be evenly and quickly heated by a high frequency induction coil of the type now in extensive use. The short heating period reduces sealing due to oxidation to a minimum as compared to previous methods of heating bar stock in gas or oil fired furnaces and upsetting the heated ends to provide the starting blank.

It is to be understood that applicant has made only one preferred disclosure of dies by which his improved method of forming bearing races may be practiced, and that he claims as his invention all modifications falling within the scope of the appended claim.

What is claimed is:

A method of forming a bearing race for tapered roller bearings, which method includes compressing a relatively long circular blank having a grain flow extending axially of the blank into a flat circular slug of greater width than the initial blank, compressing the slug further between a pair of substantially closed dies having centrally located and oppositely disposed projecting portions and oppositely disposed annular recesses extending circumferentially of the projecting portions, the compression forming a circular member having a greater width and being thinner in cross section than the slug, said projecting portions forming a thin centrally disposed recessed web in said circular member, punching out the web to form an opening, placing said circular member between second dies to form it into an annular element in the form of a segment of a cone, removing said segment from the second dies and placing said segment into third dies in a reversed position with respect to the position of the segment in the second dies, and operating on the segment of the cone with said second dies to increase the diameter of the segment at its smaller end to the same diameter as the outer diameter of the other end and reversing the angle of the interior wall of the segment.

JOHN J. DIERBECK.

REFERENCES CITED

The following references are of record in the file of this patent:

UNITED STATES PATENTS

| Number | Name | Date |
|---|---|---|
| 1,396,281 | Pacque | Nov. 8, 1921 |
| 1,410,093 | Dallmeyer | Mar. 21, 1922 |
| 1,431,183 | Rockwell | Oct. 10, 1922 |
| 1,717,419 | Steinman | June 18, 1929 |
| 1,971,083 | Schlad | Aug. 21, 1934 |
| 2,014,605 | Zimmerman | Sept. 17, 1935 |
| 2,030,290 | Friedman | Feb. 11, 1936 |
| 2,126,912 | Murden | Aug. 16, 1938 |
| 2,116,804 | Swanson | May 10, 1938 |
| 2,267,229 | Zimmerman | Dec. 23, 1941 |
| 2,389,758 | Bitterman | Nov. 27, 1945 |